United States Patent
Xi et al.

(10) Patent No.: US 11,316,722 B2
(45) Date of Patent: Apr. 26, 2022

(54) ORTHOGONAL FREQUENCY DIVISION MULTIPLEXING SYMBOL GENERATION METHOD AND COMMUNICATION DEVICE

(71) Applicant: VIVO MOBILE COMMUNICATION CO., LTD., Guangdong (CN)

(72) Inventors: Wei Xi, Guangdong (CN); Hao Liu, Guangdong (CN); Peng Sun, Guangdong (CN); Xiaodong Sun, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 19 days.

(21) Appl. No.: 16/757,506

(22) PCT Filed: Oct. 11, 2018

(86) PCT No.: PCT/CN2018/109832
§ 371 (c)(1),
(2) Date: Apr. 20, 2020

(87) PCT Pub. No.: WO2019/095905
PCT Pub. Date: May 23, 2019

(65) Prior Publication Data
US 2020/0252172 A1    Aug. 6, 2020

(30) Foreign Application Priority Data
Nov. 16, 2017  (CN) .......................... 201711135866.3

(51) Int. Cl.
*H04L 27/26* (2006.01)
*H04L 5/00* (2006.01)

(52) U.S. Cl.
CPC ...... *H04L 27/26134* (2021.01); *H04L 5/0048* (2013.01); *H04L 27/26* (2013.01);
(Continued)

(58) Field of Classification Search
CPC .. H04L 5/0048; H04L 27/25; H04L 27/26134
See application file for complete search history.

(56) References Cited

U.S. PATENT DOCUMENTS 9,240,872 B2   1/2016  Bao et al.
2013/0272282 A1  10/2013  Baik et al.
(Continued)

FOREIGN PATENT DOCUMENTS

CN    104221316 A    12/2014
CN    105827383 A     8/2016
(Continued)

OTHER PUBLICATIONS

Extended European Search Report dated Nov. 23, 2020 issued in PCT/CN2018/109832.
(Continued)

*Primary Examiner* — Kevin C. Harper
(74) *Attorney, Agent, or Firm* — Gearhart Law LLC; David Postolski, Esq.

(57) ABSTRACT

An OFDM symbol generation method and a communication device are provided. The method includes: generating a target sequence based on a PTRS bit sequence, wherein the target sequence includes a symbol sequence generated by inserting the PTRS bit sequence into a data bit sequence and performing modulation, a symbol sequence generated by inserting a modulated symbol sequence of the PTRS bit sequence into a modulated symbol sequence of the data bit sequence and performing phase-rotation, or a symbol sequence generated by inserting a PTRS symbol sequence into a data symbol sequence, the PTRS symbol sequence is generated by modulating the PTRS bit sequence according to an index of a PTRS bit, the data symbol sequence is generated by modulating the data bit sequence according to (Continued)

an index of a data bit; and generating the OFDM symbol based on the target sequence.

12 Claims, 8 Drawing Sheets

(52) U.S. Cl.
  CPC .......... *H04L 5/001* (2013.01); *H04L 27/2613* (2013.01); *H04L 27/2614* (2013.01)

(56) References Cited

U.S. PATENT DOCUMENTS

| | | | |
|---|---|---|---|
| 2014/0016622 A1 | 1/2014 | Bao et al. | |
| 2015/0146640 A1 | 5/2015 | Baldemair et al. | |
| 2018/0198667 A1 | 7/2018 | He | |
| 2019/0342137 A1* | 11/2019 | Zhang | H04L 27/2614 |
| 2020/0076670 A1* | 3/2020 | Liu | H04L 1/1812 |

FOREIGN PATENT DOCUMENTS

| | | |
|---|---|---|
| CN | 106664278 A | 5/2017 |
| CN | 107040487 A | 8/2017 |
| EP | 3573300 A1 | 11/2019 |
| JP | 2009302992 A | 12/2009 |
| JP | 2012105079 A | 5/2012 |

OTHER PUBLICATIONS

3GPP TSG RAN WG1 Meeting AH NR#3, R1-1715473, Nagoya, Japan, Sep. 18-21, 2017, "Further details of PTRS", 11 pages.
3GPP TSG RAN WG1 Meeting #92, R1-1801526, Athens, Greece, Feb. 26-Mar. 2, 2018, "Remaining Issues on PT-RS", 8 pages.
Office Action dated Feb. 3, 2020 issued in Chinese Application No. 201711135866.3.
3GPP TSG RAN WG1 Ad Hoc Meeting; R1-1709940; Jun. 30, 2017, 6 pages.
3GPP TSG-RAN WG1 Meeting #90bis; R1-1712266; Aug. 2017; 13 pages.
3GPP TSG RAN WG1 Meeting; #90bis; R1-1717306; Oct. 13, 2017; 13 pages.
Written Opinion and Search Report dated May 28, 2020 issued in PCT/CN2018/109832.
3GPP TSG-RAN WG1 Meeting #90; R1-1714315; Aug. 2017; 13 pages.
3GPP TSG RAN WG1 NR Ad-Hoc #3; R1-1716724; Sep. 2017; 11 pages.
Non Patent Literature 3GPP TSG RAN WG1 Meeting #89 Dated from May 15-May 19, 2017, 8 pages.
Non Patent Literature 3GPP TSG-RAN WG1 #90 bis Dated from Oct. 9-13, 2017, 9 pages.
Non Patent Literature 3GPP TSG-RAN WG1 #90b Dated from Oct. 9-13, 2017, 14 pages.
Notice of Reasons for Refusal received for Korean Patent Application No. 10-2020-7016850 dated Apr. 27, 2021, 6 pages and 6 pages of translation.
Notification of Reason for Refusal for Japanese Application No. 2020-522021 submission dated May 24, 2021, 4 pages and 4 pages of translation.
Indian Examination Report, dated Aug. 4, 2021 issued in IN202027016965.

* cited by examiner

ORTHOGONAL FREQUENCY DIVISION MULTIPLEXING SYMBOL GENERATION METHOD AND COMMUNICATION DEVICE

CROSS-REFERENCE TO RELATED APPLICATION

This application is the U.S. national phase of PCT Application No. PCT/CN2018/109832 filed on Oct. 11, 2018, which claims a priority to a Chinese Patent Application No. 201711135866.3 filed in China on Nov. 16, 2017, the disclosures of which are incorporated in their entirety by reference herein.

TECHNICAL FIELD

The present disclosure relates to the field of communication technology, in particular, relates to a method of generating an Orthogonal Frequency Division Multiplexing (OFDM) symbol and a communication device.

BACKGROUND

A $5^{th}$ generation (5G) communication system uses communication at a high frequency band to improve a link transmission rate. However, in practical applications, the higher an operating frequency is, the greater the phase noise is. Therefore, for transmission at a high frequency band, for a purpose of removing the phase noise, a sending end needs to transmit a reference signal, i.e., a Phase Tracking Reference Signal (PTRS) known to a receiving end. The receiving end may estimate the phase noise according to the PTRS and then perform corresponding phase compensation. A PTRS sequence is inserted into a data sequence in a form of a chunk in a time domain, and an Orthogonal Frequency Division Multiplexing (OFDM) symbol is generated based on the sequence generated after the insertion. At present, a PTRS bit sequence and a data bit sequence are independently modulated. Since the PTRS bit sequence and the data bit sequence are independently modulated, a phase jump $\pi$ may occur at a boundary sampling point of a PTRS chunk. For example, assuming that an n-th PTRS chunk includes K modulated PTRS symbols, denoted as $r_n(i)$, i=0, K−1, which are mapped onto a $k_n$-th sample point, a $(k_n+1)$-th sample point, . . . , a $(k_n+K−1)$-th sample point in the time domain, respectively. Since the PTRS sequence and the data sequence are independently modulated, a phase jump $\pi$ may occur at the boundary sampling point of the PTRS chunk, such as between a $(k_n−1)$-th sampling point and the $k_n$-th sampling point, and between the $(k_n+K−1)$-th sampling point and a $(k_n+K)$-th sampling point. Since the phase jump $\pi$ may occur, a Peak to Average Power Ratio (PAPR) may be relatively high.

SUMMARY

A method of generating an orthogonal frequency division multiplexing (OFDM) symbol, includes: generating a target sequence based on a Phase Tracking Reference Signal (PTRS) bit sequence, wherein the target sequence includes a symbol sequence generated by inserting the PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit; and generating the OFDM symbol based on the target sequence.

In a first aspect, some embodiments of the present disclosure further provide a method of generating an OFDM symbol. The method includes generating a target sequence based on a Phase Tracking Reference Signal (PTRS) bit sequence, wherein the target sequence includes a symbol sequence generated by inserting the PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit; and generating the OFDM symbol based on the target sequence.

In a second aspect, some embodiments of the present disclosure further provide a communication device. The communication device includes a first generation module, used to generate a target sequence based on a Phase Tracking Reference Signal (PTRS) bit sequence, wherein the target sequence includes a symbol sequence generated by inserting the PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit; and a second generation module, used to generate an Orthogonal Frequency Division Multiplexing (OFDM) symbol based on the target sequence.

In a third aspect, some embodiments of the present disclosure also provide a communication device. The communication device includes a storage, a processor, and a computer program stored on the storage and executable by the processor, wherein, the computer program is executed by the processor to implement steps in the method of generating an OFDM symbol according to the embodiments of the present disclosure.

In a fourth aspect, some embodiments of the present disclosure also provide a computer readable storage medium. The computer readable storage medium includes a computer program stored thereon, wherein, the computer program is executed by a processor to implement steps in the method of generating an OFDM symbol according to the embodiments of the present disclosure.

BRIEF DESCRIPTION OF THE DRAWINGS

In order to more clearly illustrate the technical solutions of the embodiments of the present disclosure, accompanying drawings used in description of the embodiments of the present disclosure will be briefly described below, and it will be apparent that the accompanying drawings in the following description are only some embodiments of the present disclosure. For those of ordinary skills in the art, other drawings may also be obtained from these drawings without creative work.

DETAILED DESCRIPTION

The technical solutions in the embodiments of the present disclosure will be clearly and completely described hereinafter in conjunction with the drawings in the embodiments of the present disclosure. It will be apparent that the described embodiments are some, rather than all, of the embodiments of the present disclosure. Based on the embodiments of the present disclosure, all other embodiments obtained by those of ordinary skills in the art without creative work are within the protection scope of the present disclosure. In the specification and in the claim, "A and/or B" denotes A only, or B only, or both A and B.

Figure 1:
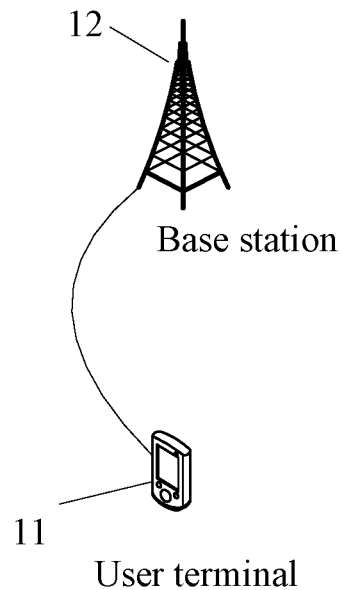
FIG. 1 is a structural diagram of a network system to which some embodiments of the present disclosure are applicable.

Referring to FIG. 1, FIG. 1 is a structural diagram of a network system to which some embodiments of the present disclosure are applicable. As shown in FIG. 1, the network system includes a user terminal 11 and a base station 12, wherein, the user terminal 11 may be a User Equipment (UE), for example, a terminal-side device, such as a mobile phone, a Tablet Personal Computer, a Laptop Computer, a Personal Digital Assistant (PDA), a Mobile Internet Device (MID), a Wearable Device, or the like. A specific type of the user terminal 11 is not limited in some embodiments of the present disclosure. The base station 12 described above may be a base station (e.g., a gNB, a 5G NR NB) in the 5G communication and later versions of mobile communication, or a base station in other communication systems, or referred to as an Node B, an Evolved Node B, or other terms in the field, as long as the same technical effect is achieved. The base station is not limited to a specific technical term. It should be noted that, only the base station in the 5G communication is taken as an example, but a specific type of the base station 12 is not limited in some embodiments of the present disclosure.

It should be noted that the communication device in some embodiments of the present disclosure may be the user terminal 11 or may be the base station 12, and specific functions of the communication devices will be described in detail in the following embodiments.

Figure 2:
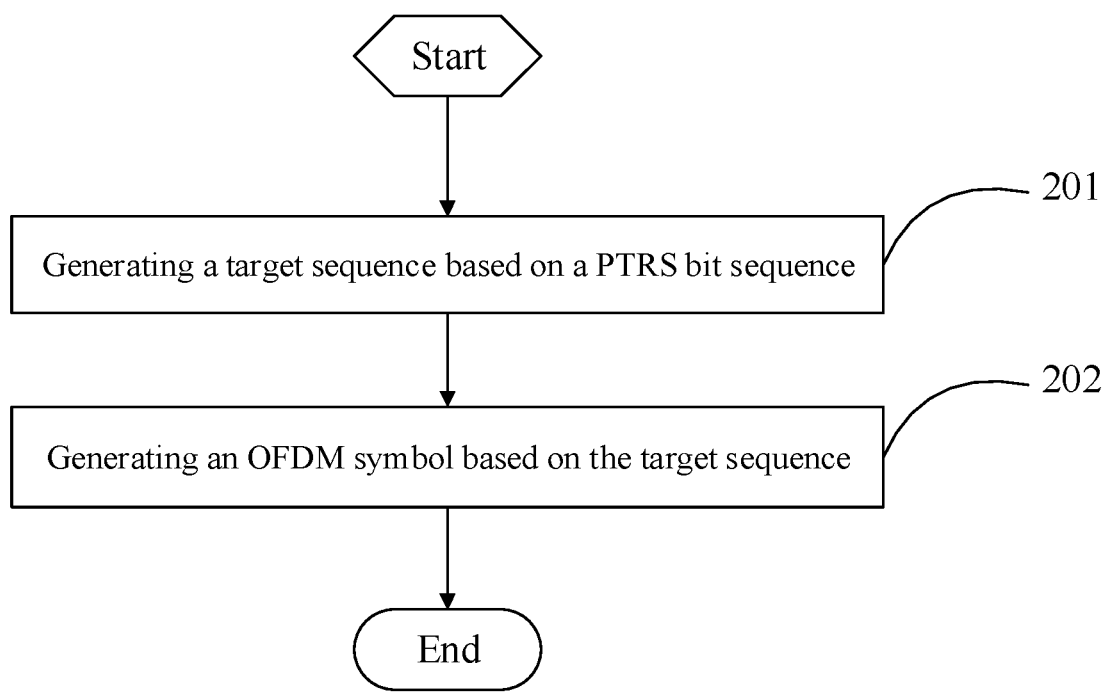
FIG. 2 is a flowchart of a method of generating an OFDM symbol provided by some embodiments of the present disclosure.

Referring to FIG. 2, FIG. 2 is a flowchart of a method of generating an OFDM symbol provided by some embodiments of the present disclosure. The method is applied to a communication device. The communication device can be used in a sending end of a user terminal or a base station, or in a sending end of a communication device capable of communicating using an OFDM symbol. Referring to FIG. 2 specifically, the method includes the following steps.

Step 201: generating a target sequence based on a PTRS bit sequence, wherein the target sequence includes a symbol sequence generated by inserting a PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit.

The symbol sequence generated by inserting the PTRS bit sequence into the data bit sequence and modulating the sequence obtained after the inserting can be understood as a symbol sequence generated by: inserting the PTRS bit sequence into the data bit sequence to obtain a synthesized bit sequence, and modulating the synthesized bit sequence using a π/2-Binary Phase Shift Keying (π/2-BPSK) modulation. Since the target sequence is a symbol sequence generated after the inserting and the modulating, it is ensured that a phase variation of adjacent sampling points of the symbol sequence is always ±π/2, and the PAPR may be ensured to be low.

The above symbol sequence generated by inserting the modulated symbol sequence of the PTRS bit sequence into the modulated symbol sequence of the data bit sequence and phase-rotating the sequence obtained after the inserting may be a symbol sequence generated by: performing the π/2-BPSK modulation on the PTRS bit sequence and the data bit sequence independently to obtain corresponding modulated symbol sequences, inserting the modulated symbol sequence of the PTRS bit sequence into the modulated symbol sequence of the data bit sequence to obtain a synthesized symbol sequence, and phase-rotating the synthesized symbol sequence, thereby ensuring a lower PAPR.

The above symbol sequence generated by inserting the PTRS symbol sequence into the data symbol sequence may be a symbol sequence generated by: calculating an index (or a number), in a synthesized sequence, of each PTRS bit of the PTRS bit sequence in advance, calculating an index, in the synthesized sequence, of each data bit of the data bit sequence in advance, modulating the PTRS bit sequence according to an index of each PTRS bit, and modulating the data bit sequence according to an index of each data bit, wherein modulating the PTRS bit sequence according to the index of each PTRS bit may be a case that an index used in a modulation process of modulating the PTRS bit sequence is the index, in the synthesized sequence, of each PTRS bit; modulating the data bit sequence according to the index of each data bit may be a case that an index used in a modulation process of modulating the data bit sequence is the index, in the synthesized sequence, of each data bit, thereby ensuring that unified indices are used in the modulation processes, avoiding possible phase jump brought by modulating the PTRS bit sequence and the data bit sequence independently, and ensuring a lower PAPR.

In some embodiments of the present disclosure, inserting the PTRS bit sequence into the data bit sequence may be a case of inserting the PTRS bit sequence into the data bit sequence in a form of chunk according to a PTRS pilot pattern; inserting the PTRS symbol sequence into the data symbol sequence may also be a case of inserting the PTRS symbol sequence into the data symbol sequence in the form of chunk according to the PTRS pilot pattern, wherein the PTRS pilot pattern may generally be implicitly indicated by the number of scheduled Resource Blocks (RBs), and includes a size (K), the number (X), and a location of the chunk. For convenience of description, the PTRS pilot pattern is denoted as X×K, where K and X are positive integers.

Step 202: generating an OFDM symbol based on the target sequence.

Generating the OFDM symbol based on the target sequence may be a case of generating a Discrete Fourier transform (DFT)-s-OFDM (DFT-s-OFDM) symbol by performing a DFT, a precoding and a resource mapping on the target sequence.

It should be noted that the above method provided in some embodiments of the present disclosure can be applied to a 5G system, but is not limited thereto, and is also applicable to other communication systems as long as substantially the same function can be realized. For example, the above method may be applied to a 6$^{th}$ Generation (6G) mobile communication system or another OFDM-based communication system or the like.

In this embodiment, the target sequence is generated based on the PTRS bit sequence, wherein the target sequence includes the symbol sequence generated by inserting the PTRS bit sequence into the data bit sequence and modulating a sequence obtained after the inserting, a symbol sequence generated by inserting the modulated symbol sequence of the PTRS bit sequence into the modulated symbol sequence of the data bit sequence and phase-rotating a sequence obtained after the inserting, or a symbol sequence generated by inserting the PTRS symbol sequence into the data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit; and an OFDM symbol is generated based on the target sequence. The embodiments of the present disclosure may reduce the PAPR.

Figure 3:
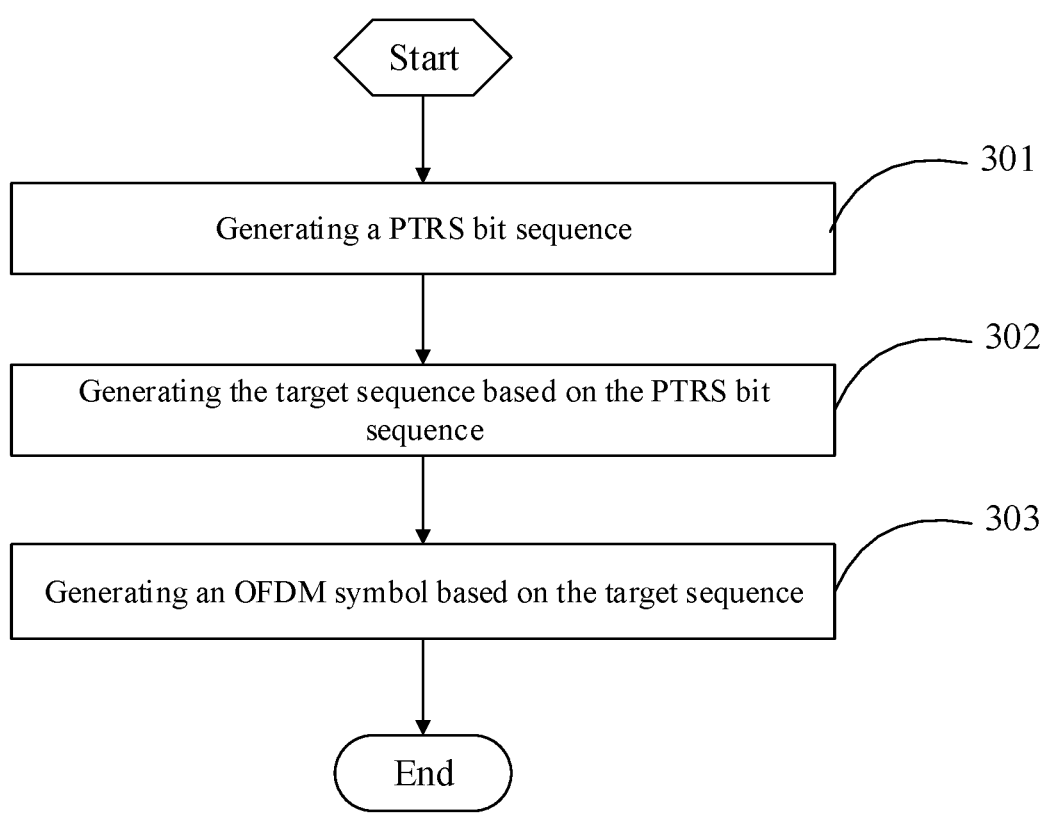
FIG. 3 is another flowchart of a method of generating an OFDM symbol provided by some embodiments of the present disclosure.

Referring to FIG. 3, FIG. 3 shows another method of generating an OFDM symbol provided by some embodiments of the present disclosure. The method is applied to a communication device. The communication device may be used in a sending end of a user terminal or a base station, or a sending end of a communication device capable of communicating using an OFDM symbol. As shown in FIG. 3, the method includes the following steps.

Step 301: generating a PTRS bit sequence.

In Step 301, the PTRS bit sequence may be generated according to a PTRS pilot pattern by any of following manners: taking as the PTRS bit sequence X×K bits at a preset position in a Demodulation Reference Signal (DMRS) sequence, wherein X is an integer greater than 0, K is an integer greater than 0, and the DMRS sequence is a sequence modulated by using the π/2-BPSK; or taking as the PTRS bit sequence a bit having a location, in a DMRS sequence, corresponding to a PTRS pilot pattern, wherein the DMRS sequence is a sequence modulated by using the π/2-BPSK; or taking as the PTRS bit sequence a sub-sequence, in a sequence scrambled with a Cell Identifier (Cell ID), corresponding to a frequency-domain position to which a PTRS resource is mapped, wherein a length of the sequence scrambled with the Cell identifier is equal to the number of subcarriers within a system bandwidth.

Taking X×K bits at a preset position in a DMRS sequence as the PTRS bit sequence may be a case of taking continuous X×K bits at the preset position in the DMRS sequence as the PTRS bit sequence. Of course, the present disclosure is not limited thereto. In some scenarios, discontinuous X×K bits may also be taken as the PTRS bit sequence.

The above π/2-BPSK modulation may be a modulation of multiplying $e^{ji\pi}/2$ on a basis of a BPSK modulation, where i is a bit index. For example, the above π/2-BPSK modulation may be a modulation according to an Equation (1):

$$x_i = \frac{e^{ji\pi/2}}{\sqrt{2}}[(1-2b_i) + j(1-2b_i)], \quad \text{Equation (1),}$$

Where $x_i$ is a modulated π/2-BPSK symbol corresponding to a i-th bit; $b_i$ is a bit sequence to be modulated, and j is a unit of an imaginary number. Obviously, the modulation can ensure that the phase variation is always ±π/2 without a phase jump π. Therefore, π/2-BPSK modulation can further reduce the PAPR as compared to BPSK.

It should be noted that in some embodiments of the present disclosure, the π/2-BPSK modulation may also be referred to as a Pi/-BPSK modulation.

For example, Step 301 may generate the PTRS bit sequence according to the PTRS pilot pattern (such as the size of a chunk, the number of chunks, and the position of a chunk) by using any of the following manners: intercepting a sequence having a length of X×K bits from the beginning of the DMRS sequence modulated by the π/2-BPSK, or the end of the DMRS sequence modulated by the π/2-BPSK, or anywhere in the middle of the DMRS sequence modulated by the π/2-BPSK, taking the sequence having the length as a PTRS bit sequence; or puncturing the DMRS sequence modulated by the π/2-BPSK, discarding a bit at a position other than a position corresponding the PTRS pilot pattern, and then taking a remaining bit sequence as the PTRS bit sequence; or extracting from a parent sequence a sub-sequence at a position corresponding to a frequency-domain position to which a PTRS resource is mapped, and taking the extracted sub-sequence as the PTRS bit sequence. The parent sequence may be scrambled with a cell identifier and has a length equal to the number of subcarriers within the system bandwidth, and is shared by all users within the same cell. The parent sequence may also be understood as a sequence scrambled with the cell identifier.

In addition, at least two user terminals in a cell corresponding to the cell identifier may use the sequence scrambled with the cell identifier to generate a PTRS bit sequence, and sequences scrambled with cell identifiers of different cells are different.

In this way, it needs not to configure too many sequences, so as reduce a system overhead. Further, all user terminals in the cell corresponding to the cell identifier can use the sequence scrambled with the cell identifier to generate the PTRS bit sequence, thereby ensuring that PTRS bit sequences of all user terminals in the same cell are extracted from the same sequence. Of course, PTRS sequences generated by different user terminals in the same cell may be different, for example, different user terminals may extract sequences at different positions from the sequence scrambled with the cell identifier, as PTRS bit sequences corresponding to the user terminals respectively.

In this way, all user terminals in the same cell may share the sequence scrambled with the cell identifier.

In this embodiment, since Step 301 can obtain the PTRS bit sequence from the DMRS sequence modulated by the $\pi/2$-BPSK modulation, it can be ensured that the phase variation of the PTRS bit sequence is maintained to be $+\pi/2$, in order to further reduce the PAPR.

Step 302: generating the target sequence based on the PTRS bit sequence, wherein the target sequence includes a symbol sequence generated by inserting the PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit.

Step 303: generating an OFDM symbol based on the target sequence.

As an optional embodiment, generating the target sequence based on the PTRS bit sequence, includes: inserting the PTRS bit sequence into the data bit sequence; performing a $\pi/2$-BPSK modulation on a bit sequence obtained after the inserting, so as to generate the target sequence.

Figure 4:
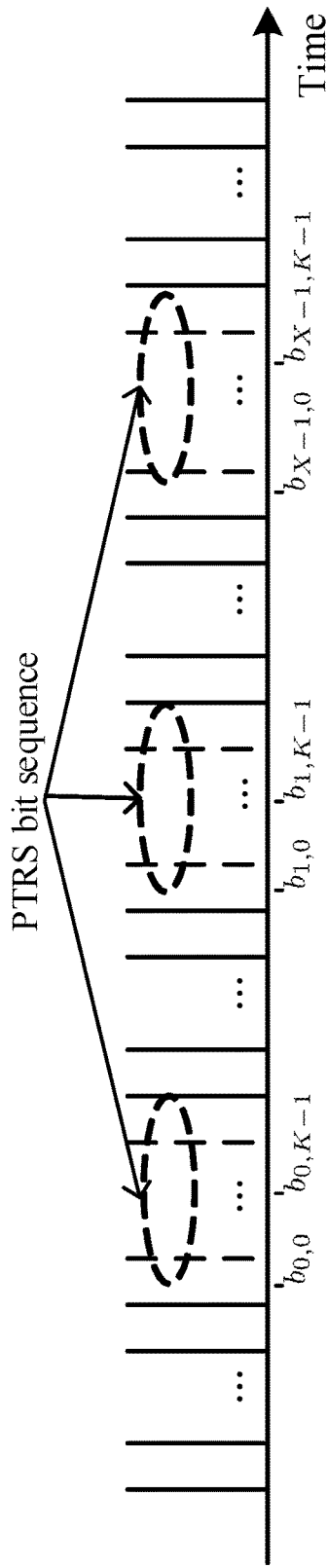
FIG. 4 is a schematic diagram of inserting a sequence provided by some embodiments of the present disclosure.

In this embodiment, the PTRS bit sequence may be inserted into the data bit sequence according to the PTRS pilot pattern, and a generated new bit sequence is denoted as $p\ell$, as shown in FIG. 4.

Specific description of this embodiment can be made in the following: generating the PTRS bit sequence according to the PTRS pilot pattern (such as the size of the chunk, the number of chunks, and the position of the chunk) by using any of the following manners: intercepting a sequence having a length of X×K bits from the beginning of the DMRS sequence modulated by the $\pi/2$-BPSK, or the end of the DMRS sequence modulated by the $\pi/2$-BPSK, or anywhere in the middle of the DMRS sequence modulated by the $\pi/2$-BPSK, taking the sequence having the length as the PTRS bit sequence; or puncturing the DMRS sequence modulated by the $\pi/2$-BPSK, discarding a bit at a position other than a position corresponding the PTRS pilot pattern, and then taking a remaining bit sequence as the PTRS bit sequence; or extracting from a parent sequence a sub-sequence at a position corresponding to a frequency-domain position to which a PTRS resource is mapped, and taking the extracted sub-sequence as the PTRS bit sequence. The parent sequence may be scrambled with a cell identifier and has a length equal to the number of subcarriers within the system bandwidth, and is shared by all users within the same cell.

Figure 5:
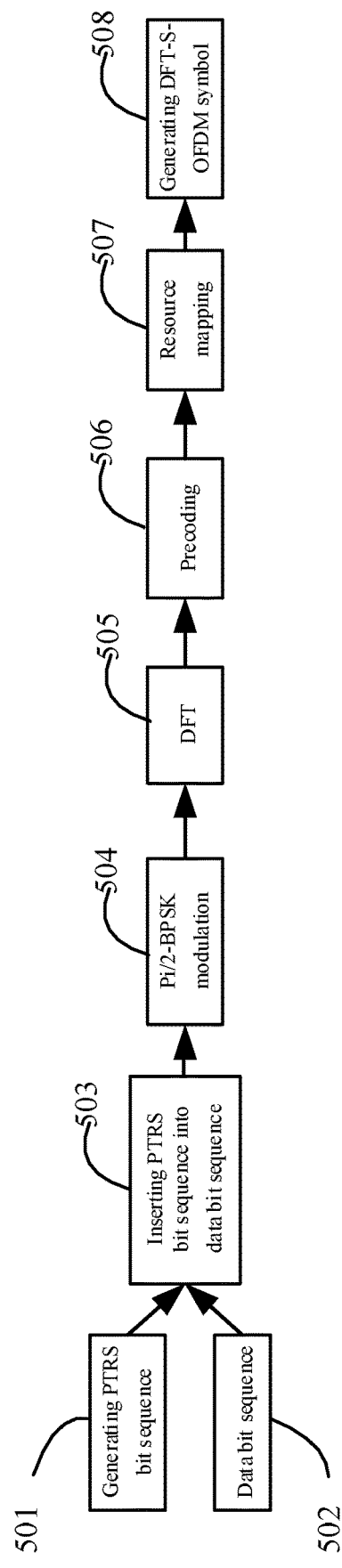
FIG. 5 is a schematic diagram of a method of generating an OFDM symbol provided by some embodiments of the present disclosure.

The generated PTRS bit sequence is inserted into the data bit sequence, and then the $\pi/2$-BPSK modulation is performed on the above synthesized bit sequence, as shown in FIG. 5.

Further, in this embodiment, assuming that the PTRS pilot pattern is X×K, the PTRS bit sequence is denoted as $b_{c,i}$, $c=0, 1, \ldots, X-1$ is a numbering index of a chunk, $i=0, 1, \ldots, K-1$ is an index of a sampling point in each chunk. The data bit sequence is denoted as $d_j$, $j=0, 1, \ldots, N-X\times K-1$, where N is a DFT size.

Firstly, after the PTRS bit sequence is inserted into the data bit sequence according to the PTRS pilot pattern, a generated new bit sequence is denoted as $p\ell$, as shown in FIG. 4. Then, the generated new bit sequence $p\ell$ is modulated using the $\pi/2$-BPSK modulation into a symbol sequence $q\ell$ according to an Equation (2).

$$q_\ell = \frac{e^{j\ell\pi/2}}{\sqrt{2}}[(1-2p_\ell) + j(1-2p_\ell)], \quad \text{Equation (2)}$$

$$\ell = 0, 1, \ldots, N-1.$$

As shown in FIG. 5, a specific process may include following Steps:

Step 501: generating a PTRS bit sequence.

Step 502: acquiring a data bit sequence.

Step 503: inserting the PTRS bit sequence into the data bit sequence.

Step 504: performing the $\pi/2$-BPSK modulation; the Step may be to perform the $\pi/2$-BPSK modulation on a sequence obtained after the inserting, so as to obtain a modulated symbol sequence.

Step 505: performing a DFT transform; the Step may be to perform the DFT transform on the modulated symbol sequence.

Step 506: precoding; the Step may be to perform a precoding on a sequence obtained after the performing the DFT transform.

Step 507: resource mapping; the Step may be to map, onto a resource, a sequence obtained after the precoding.

Step 508: generating a DFT-S-OFDM symbol.

It should be noted that an execution order between Step 501 and Step 502 is not limited.

In this embodiment, it may be ensured that a phase variation of a symbol sequence before the DFT is performed is maintained to be $\pm\pi/2$, thereby ensuring a lower PAPR.

As another optional embodiment, generating the target sequence based on the PTRS bit sequence includes: performing a BPSK modulation on the PTRS bit sequence and performing the BPSK modulation on the data bit sequence; inserting a symbol sequence obtained by performing the BPSK modulation on the PTRS bit sequence, into a symbol sequence obtained by performing the BPSK modulation on the data bit sequence; performing a phase-rotation on a symbol sequence obtained after the inserting, so as to obtain the target sequence.

In this embodiment, the BPSK modulation is independently performed on the PTRS bit sequence, and the BPSK modulation is independently performed on the data bit sequence. Then, a symbol sequence obtained by performing the BPSK modulation on the PTRS bit sequence is inserted into a symbol sequence obtained by performing the BPSK modulation on the data bit sequence to obtain a synthesized sequence, and phase-rotation is performed on the synthesized sequence. Since phase-rotation is performed on the synthesized sequence, a lower PAPR is ensured.

Optionally, performing the phase-rotation on the symbol sequence obtained after the inserting includes: performing the phase-rotation on the symbol sequence obtained after the inserting, according to an index of each symbol in the symbol sequence, wherein a phase by which the each symbol is rotated is $\pi/2$ multiplied by the index of the each symbol in the symbol sequence.

Since the symbol sequence obtained after the inserting is phase-rotated according to an index (or referred to as a numbering value) of each symbol in the symbol sequence, and the phase by which each symbol is rotated is $\pi/2$ multiplied by the index of the each symbol in the symbol sequence, it may be ensured that the phase variation of the symbol sequence before the DFT is performed is maintained to be $\pm\pi/2$, thereby ensuring a lower PAPR.

Specific description of this embodiment may be made in the following.

The PTRS bit sequence is generated according to the PTRS pilot pattern (such as the size of a chunk, the number of chunks, and the position of a chunk) by using any of the following manners: intercepting a sequence having a length of X×K bits from the beginning of the DMRS sequence modulated by the $\pi/2$-BPSK, or the end of the DMRS sequence modulated by the $\pi/2$-BPSK, or anywhere in the middle of the DMRS sequence modulated by the $\pi/2$-BPSK, taking the sequence having the length as the PTRS bit sequence; or puncturing the DMRS sequence modulated by the $\pi/2$-BPSK, discarding a bit at a position other than a position corresponding the PTRS pilot pattern, and then taking a remaining bit sequence as the PTRS bit sequence; or extracting from a parent sequence a sub-sequence at a position corresponding to a frequency-domain position to which a PTRS resource is mapped, and taking the extracted sub-sequence as the PTRS bit sequence. The parent sequence may be scrambled with a cell identifier and has a length equal to the number of subcarriers within the system bandwidth, and is shared by all users within the same cell.

Figure 6:
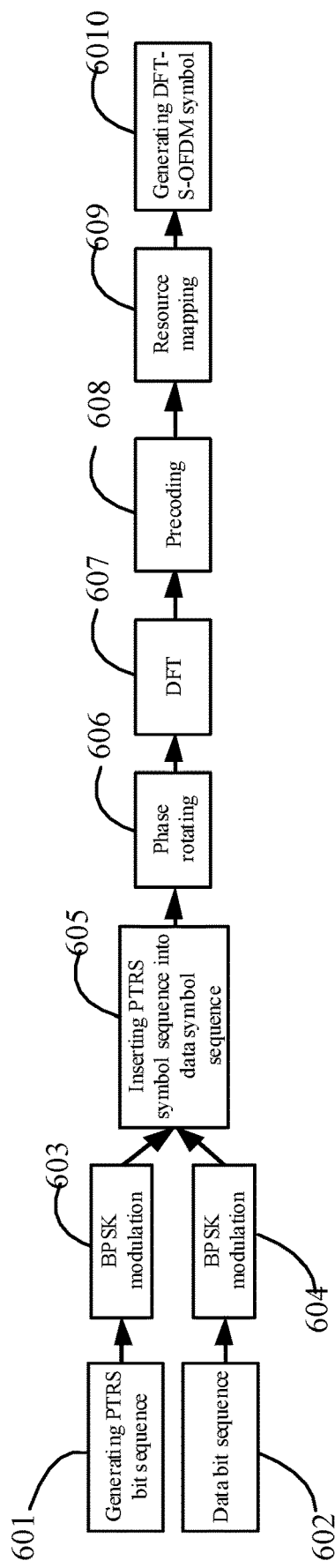
FIG. 6 is another schematic diagram of a method of generating an OFDM symbol provided by some embodiments of the present disclosure.

The BPSK modulation is performed on the PTRS bit sequence, and the BPSK modulation is performed on the data bit sequence, and then the PTRS symbol sequence is inserted into a Physical Downlink Shared Channel (PDSCH) symbol sequence, and then phase-rotation is performed on a symbol sequence synthesized above, i.e., the symbol sequence synthesized above is multiplied by $e^{ji\pi}$, wherein i is the synthesized symbol sequence, a flow is shown in FIG. 6.

Assuming that the PTRS pilot pattern is X×K, the PTRS bit sequence is denoted as $b_{c,i}$, c=0, 1, ..., X–1 is a numbering index of a chunk, i=0, 1, ..., K–1 is an index of a sampling point in each chunk. The data bit sequence is denoted as $d_j$, j=0, 1, ..., N–X×K–1, where N is a DFT size.

First, the BPSK modulation is performed on the PTRS bit sequence according to an Equation (3), and the BPSK modulation is performed on the data bit sequence are BPSK modulated according to the Equation (3), to obtain a PTRS symbol sequence and a data symbol sequence, respectively.

$$x_i = \frac{1}{\sqrt{2}}[(1-2b_i) + j(1-2b_i)], \qquad \text{Equation (3)}$$

where $b_i$ is the PTRS bit sequence or the data bit sequence, $x_i$ is a PTRS symbol sequence or a data symbol sequence. Next, the PTRS symbol sequence is inserted into the data symbol sequence according to the PTRS pilot pattern. The generated new symbol sequence is then phase-rotated according to an Equation (4).

$$q_i = e^{ji\pi/2}p_i, i=0, \ldots, N-1. \qquad \text{Equation (4)}$$

where $p_i$ and $q_i$ are a symbol sequence before the phase-rotation is performed and a symbol sequence after the phase-rotation is performed, respectively.

As shown in FIG. 6, a specific process may include the following Steps:

Step 601: generating a PTRS bit sequence.

Step 602: acquiring a data bit sequence.

Step 603: performing a BPSK modulation; this Step is performing the BPSK modulation on the PTRS bit sequence.

Step 604: performing the BPSK modulation; this Step is performing the BPSK modulation on the data bit sequence.

Step 605: inserting the PTRS symbol sequence into the data symbol sequence.

Step 606: performing the phase-rotation; this Step may be performing the phase-rotation on the sequence obtained after the inserting.

Step 607: performing a DFT transform; this Step may be performing the DFT transform on the symbol sequence obtained after performing the modulation.

Step 608: precoding; this Step may be performing precoding on the sequence obtained after performing the DFT transform.

Step 609: resource mapping; this Step may be mapping the precoded sequence onto a resource.

Step 6010: generating a DFT-S-OFDM symbol.

It should be noted that an execution order between Step 601 and Step 602 is not limited, and Step 603 is executed after Step 601 and Step 604 is executed after Step 602.

In this embodiment, it is ensured that the phase variation of the symbol sequence before the DFT is performed is maintained to be $\pm\pi/2$, thereby ensuring a lower PAPR.

As another optional embodiment, generating the target sequence based on the PTRS bit sequence includes: calculating an index, in the target sequence, of each PTRS bit in the PTRS bit sequence, and calculating an index, in the target sequence, of each data bit in the data bit sequence; performing a $\pi/2$-BPSK modulation on each PTRS bit according to the index of the each PTRS bit in the target sequence, so as to obtain the PTRS symbol sequence, and performing a $\pi/2$-BPSK modulation on each data bit according to the index of each data bit in the target sequence, so as to obtain the data symbol sequence; inserting the PTRS symbol sequence into the PTRS symbol sequence to obtain the target sequence.

In a case that a PTRS group size is even, there is no need to calculate an index, in the target sequence, of each data bit in the data bit sequence; the data symbol sequence may be obtained by performing the $\pi/2$-BPSK modulation on each data bit of the data bit sequence according to the index of the each data bit in the data bit sequence.

Inserting the PTRS symbol sequence into the data symbol sequence to obtain the target sequence may be, according to the PTRS pilot pattern (e.g., the size of the chunk, the number of chunks, and a position of the chunk), inserting the PTRS symbol sequence into the data symbol sequence to obtain the target sequence.

In addition, calculating an index, in the target sequence, of each PTRS bit in the PTRS bit sequence, and calculating an index, in the target sequence, of each data bit in the data bit sequence may be, calculating in advance, before the inserting, an index (or called a numbering value) of each bit in the target sequence after the inserting. Because an inserting position of each bit can be clearly known according to the PTRS pilot pattern, so that the index, in the target sequence, of each PTRS bit in the PTRS bit sequence can be calculated in advance, and an index, in the target sequence, of each data bit in the data bit sequence may be calculated in advance.

In addition, performing the π/2-BPSK modulation on each PTRS bit according to the index of the each PTRS bit in the target sequence, so as to obtain the PTRS symbol sequence may be: that in a process of performing the π/2-BPSK modulation, an index used by each PTRS bit is an index in the target sequence. Performing the π/2-BPSK modulation on each data bit according to the index of the each data bit in the target sequence, so as to obtain the data symbol sequence may be: that in a process of performing the π/2-BPSK modulation, an index used by each data bit is an index in the target sequence, so that the phase variation of each sampling point in the target sequence can be maintained to be ±π/2, thereby ensuring a lower PAPR.

For example, a first PTRS bit of a first chunk of the PTRS bit sequence has an index of 0 in the PTRS bit sequence. Since the first chunk of the PTRS bit sequence needs to be inserted between the $4^{th}$ bit (an index 3 in the data bit sequence) and the 5th bit (an index 4 in the data bit sequence) of the data bit sequence, then, in this embodiment, in a case of performing the π/2-BPSK modulation, the index of the first PTRS bit of the first chunk of the PTRS bit sequence is 4 (i.e., the first PTRS bit is the $5^{th}$ bit in the target sequence), and the other PTRS bits are deduced in a similar way, and the index of the $5^{th}$ bit of the data bit sequence is 4 plus the size (K) of the chunk, and the other data bits are deduced in a similar way.

In this embodiment, specific description can be made in the following.

The PTRS bit sequence is generated according to the PTRS pilot pattern (such as the size of a chunk, the number of chunks, and the position of a chunk) by using any of following manners: intercepting a sequence having a length of X×K bits from the beginning of the DMRS sequence modulated by the π/2-BPSK, or the end of the DMRS sequence modulated by the π/2-BPSK, or anywhere in the middle of the DMRS sequence modulated by the π/2-BPSK, taking the sequence having the length as the PTRS bit sequence; or puncturing the DMRS sequence modulated by the π/2-BPSK, discarding a bit at a position other than a position corresponding the PTRS pilot pattern, and then taking a remaining bit sequence as the PTRS bit sequence; or extracting from a parent sequence a sub-sequence at a position corresponding to a frequency-domain position to which a PTRS resource is mapped, and taking the extracted sub-sequence as the PTRS bit sequence. The parent sequence may be scrambled with a cell identifier and has a length equal to the number of subcarriers within the system bandwidth, and is shared by all users within the same cell.

Figure 7:
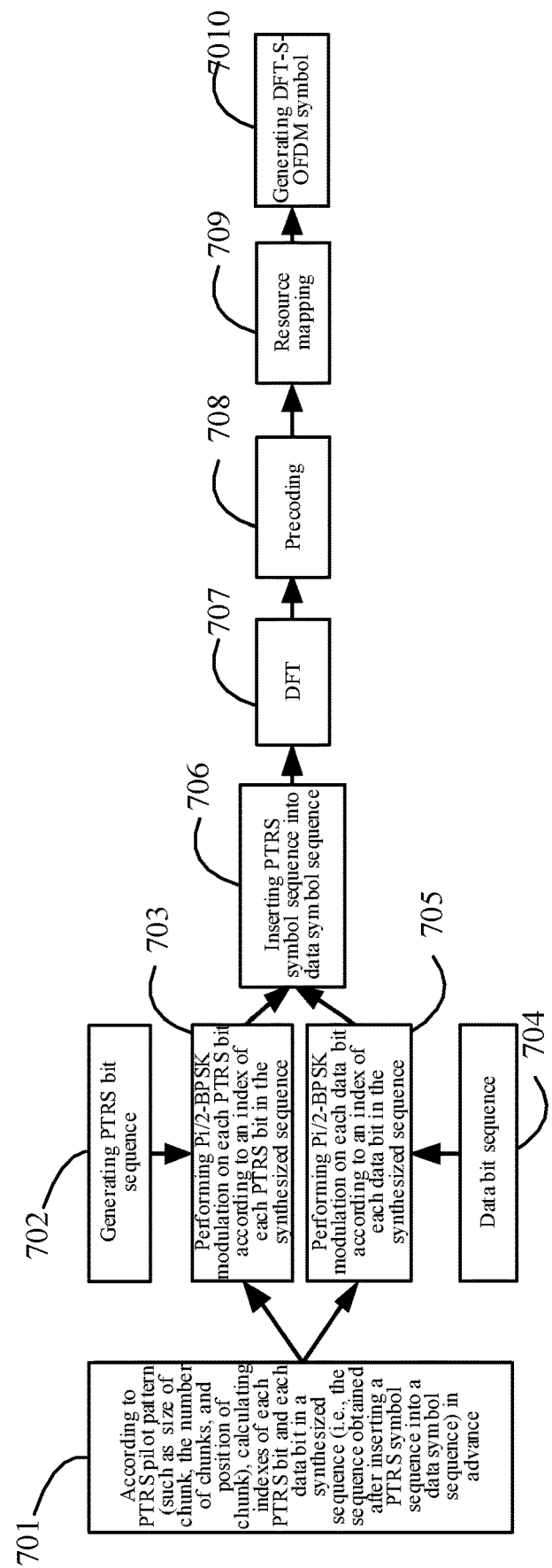
FIG. 7 is still another schematic diagram of a method of generating an OFDM symbol provided by some embodiments of the present disclosure.

Then, indexes of each PTRS bit and each data bit in the synthesized sequence (i.e., the sequence obtained by inserting the PTRS symbol sequence into the data symbol sequence) are calculated in advance. The PTRS bit sequence and the data bit sequence are then independently modulated by using the π/2-BPSK modulation according to the indexes, and then the PTRS symbol sequence can be inserted into the data symbol sequence. As shown in FIG. 7, a specific process thereof may include following Steps.

Step 701: according to the PTRS pilot pattern (such as the size of the chunk, the number of chunks, and the position of the chunk), calculating indexes of each PTRS bit and each data bit in the synthesized sequence (i.e., the sequence obtained by inserting the PTRS symbol sequence into the data symbol sequence) in advance.

Step 702: generating a PTRS bit sequence.

Step 703: performing the π/2-BPSK modulation on each PTRS bit sequence according to an index of the each PTRS bit sequence in the synthesized sequence.

Step 704: obtaining the data bit sequence.

Step 705: performing the π/2-BPSK modulation on each data bit sequence according to an index of the each data bit sequence in the synthesized sequence.

Step 706: inserting the PTRS symbol sequence into the data symbol sequence.

Step 707: performing a DFT transform; this Step may be performing the DFT transform on the symbol sequence obtained after performing the modulation.

Step 708: precoding; this Step may be performing precoding on the sequence obtained after performing the DFT transform.

Step 709: resource mapping; this Step may be mapping the precoded sequence onto a resource.

Step 7010: generating a DFT-S-OFDM symbol.

It should be noted that an execution order among Step 701, Step 702 and Step 704 is not limited. In addition, Step 703 may be executed after Step 701 and Step 702, and Step 705 may be executed after Step 701 and Step 704.

Assuming that the PTRS pilot pattern is X×K, the PTRS bit sequence is denoted as $b_{c,i}$, c=0, 1, . . . , X−1 is a numbering index of a chunk, i=0, 1, . . . , K−1 is an index of a sampling point in each chunk. The data bit sequence is denoted as $d_j$, j=0, 1, . . . , N−X×K−1, where N is a DFT size.

Firstly, indexes of each PTRS bit and each data bit in a bit sequence to be generated are calculated in advance according to the PTRS pilot pattern. Next, the π/2-BPSK modulation is performed on the PTRS bit sequence and the data bit sequence according to the Equation (1). It should be noted that, i in the Equation is the index calculated in advance in the bit sequence to be generated. Then, the modulated PTRS symbol sequence is inserted into the modulated data symbol sequence according to the PTRS pilot pattern. Steps thereafter are shown in FIG. 7.

In this embodiment, it may be ensured that the phase variation of the symbol sequence before the DFT is performed is maintained to be ±π2, thereby ensuring a lower PAPR.

This embodiment adds various optional implementations based on the embodiment shown in FIG. 2, and the phase variation of the symbol sequence before the DFT is performed may be maintained to be ±π/2, thereby ensuring a lower PAPR.

Figure 8:
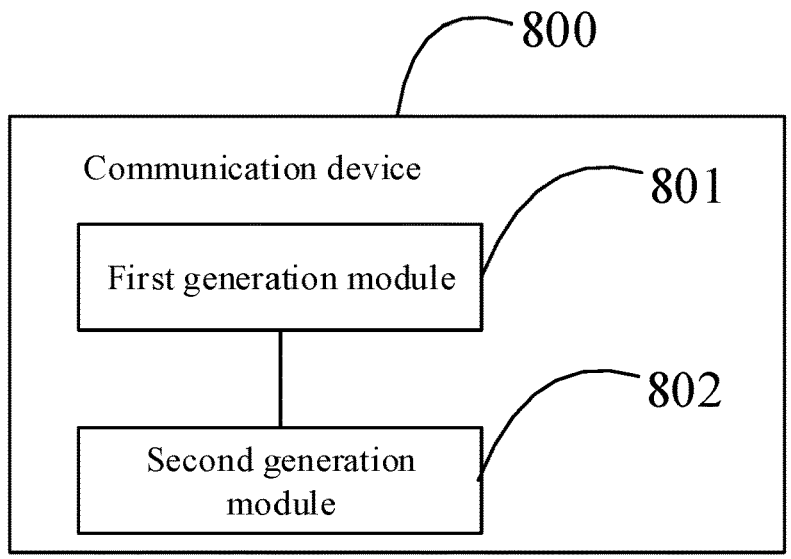
FIG. 8 is a structural diagram of a communication device provided by some embodiments of the present disclosure.

Referring to FIG. 8, FIG. 8 is a structural diagram of a communication device provided in some embodiments of the present disclosure. As shown in FIG. 8, the communication device 800 includes: a first generation module 801 and a second generation module 802.

The first generation module 801 is used to generate a target sequence based on a PTRS bit sequence, wherein the target sequence includes a symbol sequence generated by inserting the PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit. The second generation module 802 is used to generate an OFDM symbol based on the target sequence.

Those skilled in the art may understand that the above modules may be implemented as software, hardware, or a combination of software and hardware.

Optionally, the first generation module 801 is used to perform a π/2-BPSK modulation on the bit sequence obtained after the inserting, so as to generate the target sequence.

Figure 9:
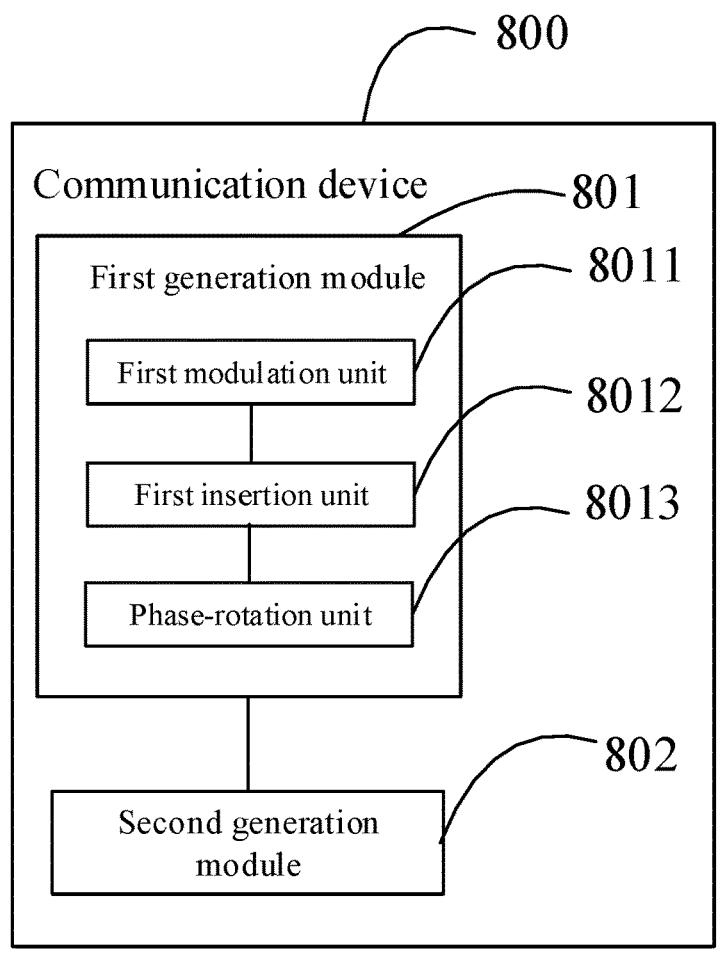
FIG. 9 is another structural diagram of a communication device provided by some embodiments of the present disclosure.

Optionally, as shown in FIG. 9, the first generation module 801 includes: a first modulation unit 8011, a first insertion unit 8012, and a phase-rotation unit 8013.

The first modulation unit 8011 is used to perform a BPSK modulation on the PTRS bit sequence and perform a BPSK modulation on the data bit sequence. The first insertion unit 8012 is used to insert a symbol sequence obtained by performing the BPSK modulation on the PTRS bit sequence, into a symbol sequence obtained by performing the BPSK modulation on the data bit sequence. The phase-rotation unit 8013 is used to perform a phase-rotation on a symbol sequence obtained after the inserting, so as to obtain the target sequence.

Optionally, the phase-rotation unit 8013 is used to perform the phase-rotation on the symbol sequence obtained after the inserting, according to an index of each symbol in the symbol sequence, so as to obtain the target sequence, wherein a phase by which the each symbol is rotated is π/2 multiplied by the index of the each symbol in the symbol sequence.

Figure 10:
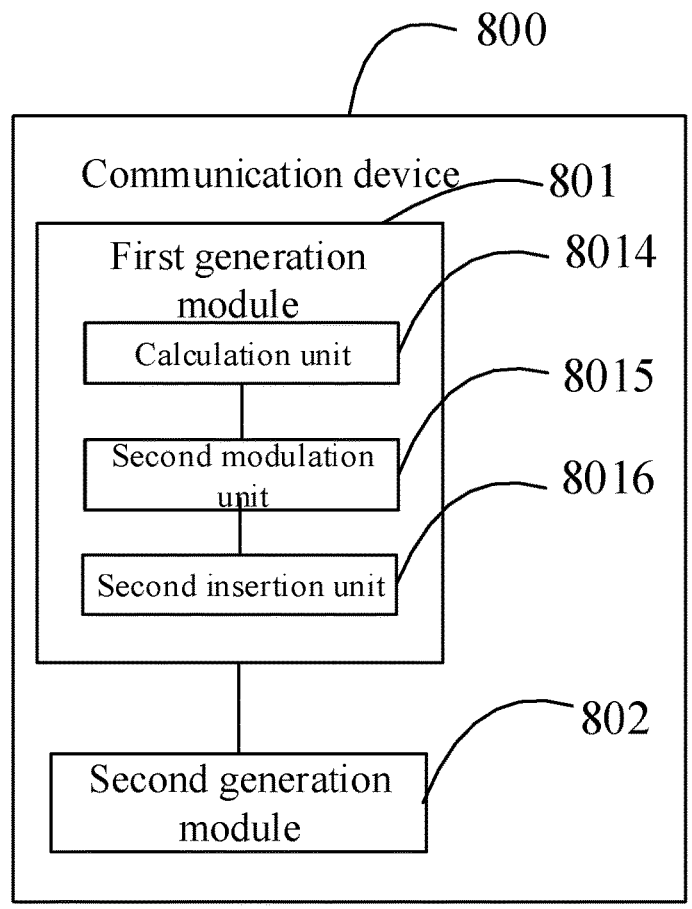
FIG. 10 is still another structural diagram of a communication device provided by some embodiments of the present disclosure.

Optionally, as shown in FIG. 10, the first generation module 801 includes: a calculation unit 8014, a second modulation unit 8015, and a second insertion unit 8016. The calculation unit 8014 is used to calculate an index, in the target sequence, of each PTRS bit in the PTRS bit sequence, and calculate an index, in the target sequence, of each data bit in the data bit sequence. The second modulation unit 8015 is used to perform a π/2-BPSK modulation on each PTRS bit according to the index of the each PTRS bit in the target sequence, so as to obtain the PTRS symbol sequence, and perform a π/2-BPSK modulation on each data bit according to the index of each data bit in the target sequence, so as to obtain the data symbol sequence. The second insertion unit 8016 is used to insert the PTRS symbol sequence into the PTRS symbol sequence to obtain the target sequence.

Figure 11:
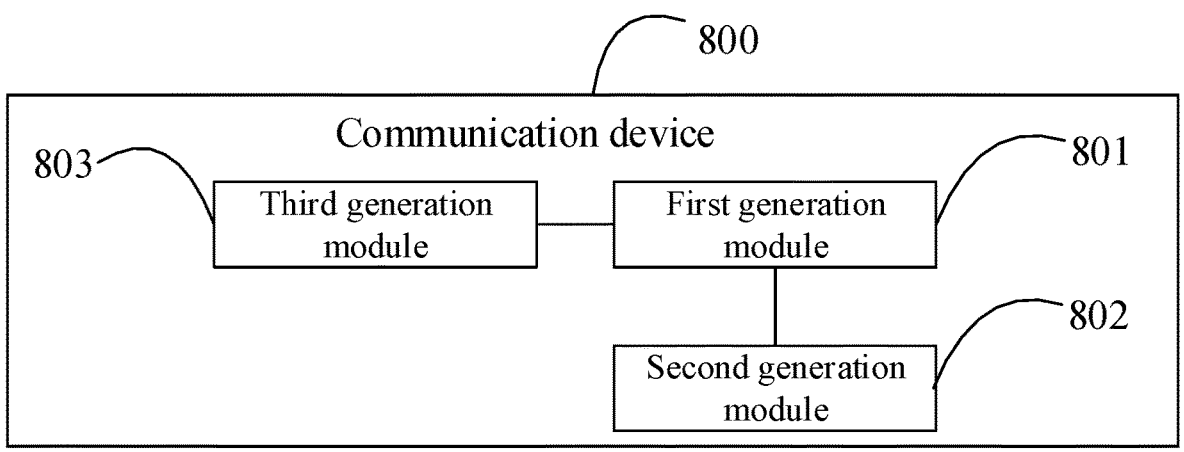
FIG. 11 is yet another structural diagram of a communication device provided by some embodiments of the present disclosure.

Optionally, as shown in FIG. 11, the communication device 800 further includes: a third generation module 803, or a fourth generation module 804, or a fifth generation module 805.

The third generation module 803 is used to take, as the PTRS bit sequence, X×K bits at a preset position in a Demodulation Reference Signal (DMRS) sequence, wherein X is an integer greater than 0, K is an integer greater than 0, and the DMRS sequence is a sequence modulated by using the π/2-BPSK. The fourth generation module 804 is used to take as the PTRS bit sequence a bit having a location, in a DMRS sequence, corresponding to a PTRS pilot pattern, wherein the DMRS sequence is a sequence modulated by using the π/2-BPSK. The fifth generation module 805 is used to take as the PTRS bit sequence a sub-sequence, in a sequence scrambled with a Cell Identifier (Cell ID), corresponding to a frequency-domain position to which a PTRS resource is mapped, wherein a length of the sequence scrambled with the Cell identifier is equal to the number of subcarriers within a system bandwidth.

Optionally, at least two user terminals in a cell corresponding to the cell identifier may use the sequence scrambled with the cell identifier, to generate the PTRS bit sequence, and sequences scrambled with cell identifiers of different cells are different.

The communication device provided by some embodiments of the disclosure can implement various processes implemented by the communication device in the method embodiments of FIG. 2 to FIG. 3. In order to avoid repetition, the detailed description thereof is omitted here, and the PAPR can be reduced.

Figure 12:
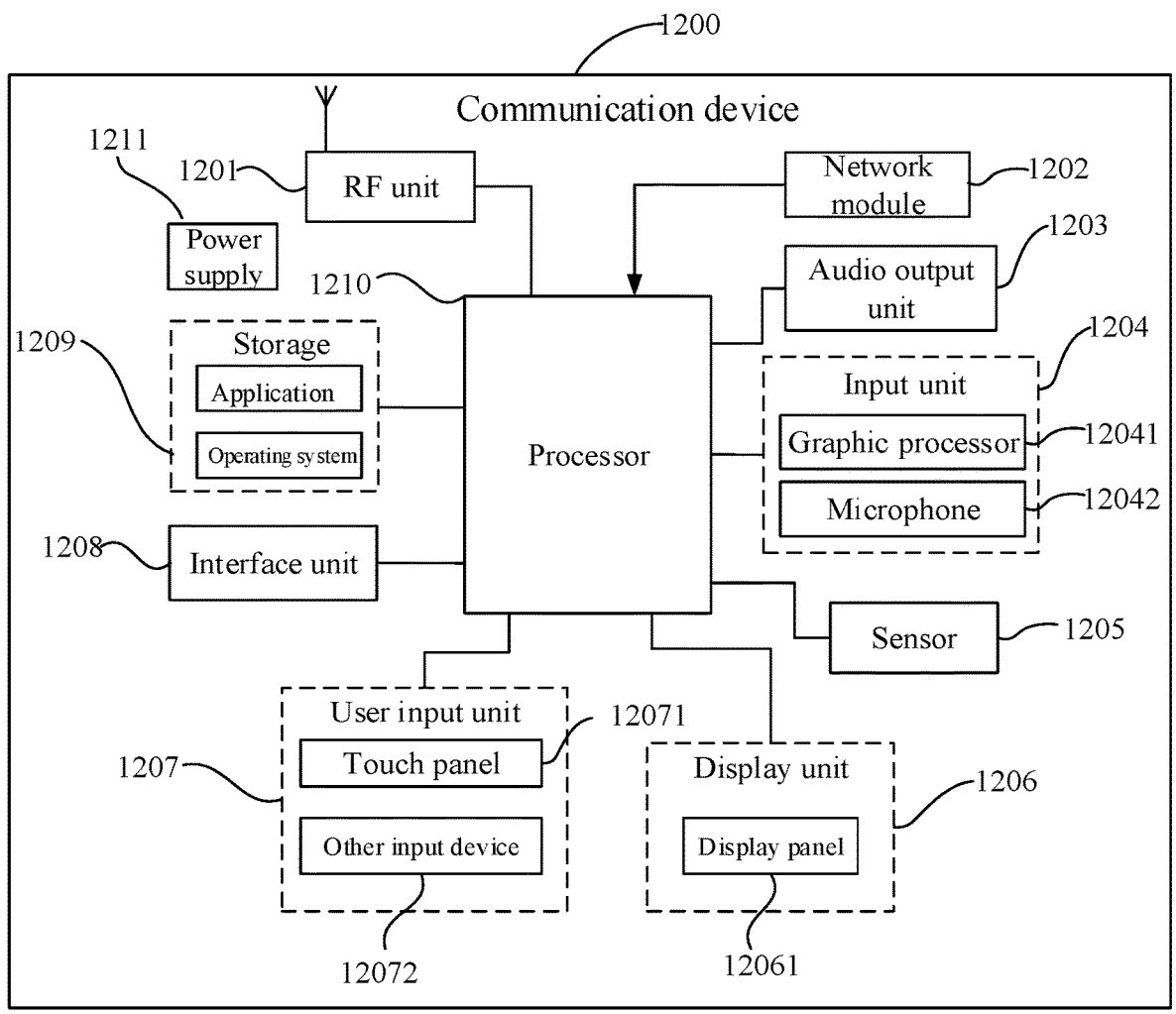
FIG. 12 is yet still another structural diagram of a communication device provided by some embodiments of the present disclosure.

FIG. 12 is a schematic diagram of a hardware structure of a communication device for implementing various embodiments of the present disclosure.

The communication device 1200 includes, but is not limited to, components such as a radio frequency unit 1201, a network module 1202, an audio output unit 1203, an input unit 1204, a sensor 1205, a display unit 1206, a user input unit 1207, an interface unit 1208, a storage 1209, a processor 1210, and a power supply 1211. Those skilled in the art will appreciate that a structure of the communication device shown in FIG. 12 does not constitute a limitation of the communication device, the communication device may include more or fewer components than illustrated, or in combination with certain components or a different arrangements of components. In some embodiments of the present disclosure, the communication device includes, but is not limit to, a mobile phone, a tablet computer, a notebook computer, a handheld computer, an on-board communication device, a wearable device, a pedometer, and the like.

The processor 1210 is used to generate a target sequence based on a PTRS bit sequence, wherein the target sequence includes a symbol sequence generated by inserting the PTRS bit sequence into a data bit sequence and modulating a sequence obtained after the inserting, a symbol sequence generated by inserting a modulated symbol sequence of the PTRS bit sequence into a modulated symbol sequence of the data bit sequence and phase-rotating a sequence obtained after the inserting, or a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating the data bit sequence according to an index of a data bit; and generate an OFDM symbol based on the target sequence.

Optionally, generating the target sequence based on the PTRS bit sequence performed by the processor 1210 includes: inserting the PTRS bit sequence into the data bit sequence; performing a π/2-BPSK modulation on the bit sequence obtained after the inserting, to generate the target sequence.

Optionally, generating the target sequence based on the PTRS bit sequence performed by the processor 1210 includes: performing a BPSK modulation on the PTRS bit sequence and performing the BPSK modulation on the data bit sequence; inserting a symbol sequence obtained by performing the BPSK modulation on the PTRS bit sequence, into a symbol sequence obtained by performing the BPSK modulation on the data bit sequence; performing a phase-rotation on a symbol sequence obtained after the inserting, so as to obtain the target sequence.

Optionally, performing the phase-rotation on the symbol sequence obtained after the inserting performed by the processor 1210 includes: performing the phase-rotation on the symbol sequence obtained after the inserting, according to an index of each symbol in the symbol sequence, wherein a phase by which the each symbol is rotated is π/2 multiplied by the index of the each symbol in the symbol sequence.

Optionally, generating the target sequence based on the PTRS bit sequence performed by the processor 1210 includes: calculating an index, in the target sequence, of each PTRS bit in the PTRS bit sequence, and calculating an index, in the target sequence, of each data bit in the data bit sequence; performing a π/2-BPSK modulation on each PTRS bit according to the index of the each PTRS bit in the target sequence, so as to obtain the PTRS symbol sequence, and performing a π/2-BPSK modulation on each data bit according to the index of each data bit in the target sequence, so as to obtain the data symbol sequence; inserting the PTRS symbol sequence into the data symbol sequence to obtain the target sequence.

Optionally, prior to generating the target sequence, the processor 1210 is further used to: take, as the PTRS bit sequence, X×K bits at a preset position in a Demodulation Reference Signal (DMRS) sequence, wherein X is an integer greater than 0, K is an integer greater than 0, and the DMRS sequence is a sequence modulated by using the π/2-BPSK; or take as the PTRS bit sequence a bit having a location, in a DMRS sequence, corresponding to a PTRS pilot pattern, wherein the DMRS sequence is a sequence modulated by using the π/2-BPSK; or take as the PTRS bit sequence a sub-sequence, in a sequence scrambled with a Cell Identifier (Cell ID), corresponding to a frequency-domain position to which a PTRS resource is mapped, wherein a length of the sequence scrambled with the Cell identifier is equal to the number of subcarriers within a system bandwidth.

Optionally, at least two user terminals in a cell corresponding to the cell identifier may use the sequence scrambled with the cell identifier, to generate the PTRS bit sequence, and sequences scrambled with cell identifiers of different cells are different.

The above communication device can reduce the PAPR.

It should be understood that, in some embodiments of the present disclosure, the radio frequency unit 1201 may be used for receiving and transmitting a signal in a process of sending and/or receiving information or in a process of calling. Specifically, after receiving downlink data from a base station, the downlink data is processed by the processor 1210. In addition, uplink data is transmitted to the base station. In general, the radio frequency unit 1201 includes, but is not limited to, an antenna, at least one amplifier, a transceiver, a coupler, a low noise amplifier, a duplexer, and the like. In addition, the radio frequency unit 1201 may also communicate with a network and other devices through a wireless communication system.

The communication device provides a wireless broadband internet access for the user via the network module 1202, such as assisting the user in sending and receiving emails, surfing web pages, accessing streaming media, and the like.

The audio output unit 1203 may convert audio data received by the radio frequency unit 1201 or the network module 1202 or stored in the storage 1209 into an audio signal and output as sound. The audio output unit 1203 may also provide audio output (e.g., a call signal reception sound, a message reception sound, etc.) related to a specific function performed by the communication device 1200. The audio output unit 1203 includes a speaker, a buzzer, a receiver, and the like.

The input unit 1204 is used to receive an audio or video signal. The input unit 1204 may include a graphics processor (Graphics Processing Unit (GPU)) 12041 and a microphone 12042. The graphics processor 12041 processes image data of still pictures or video obtained by an image capture device (such as a camera) in a video capture mode or an image capture mode. The processed image frame may be displayed on the display unit 1206. Image frames processed by the graphics processor 12041 may be stored in the storage 1209 (or another storage medium) or sent via the radio frequency unit 1201 or the network module 1202. The microphone 12042 may receive sound and be capable of processing such sound as audio data. The processed audio data may be converted, in a case of a telephone call mode, into a format output transmittable to a mobile communication base station via the radio frequency unit 1201.

The communication device 1200 also includes at least one sensor 1205, such as a light sensor, a motion sensor, and other sensors. In particular, the light sensor includes an ambient light sensor that can adjust the brightness of the display panel 12061 according to the intensity of ambient light, and a proximity sensor that can turn off the display panel 12061 or turn off a display panel 12061 and/or a backlight in a case that the communication device 1200 moves close to an ear. As one type of motion sensor, an accelerometer sensor can detect a magnitude of acceleration in various directions (generally in three axis directions), detect a magnitude and a direction of gravity when the accelerometer sensor is stationary, and can be used to recognize a posture of a communication device (such as a horizontal/vertical screen switching, related games, magnetometer attitude calibration), vibration-recognition related functions (such as a pedometer, a knock); the sensor 1205 may further include a fingerprint sensor, a pressure sensor, an iris sensor, a molecular sensor, a gyroscope, a barometer, a hygrometer, a thermometer, an infrared sensor, and the like, which will not be described here.

The display unit 1206 is used to display information inputted by a user or information provided to the user. The display unit 1206 may include a display panel 12061. The display panel 12061 is configured in a form of a Liquid Crystal Display (LCD) and an Organic Light-Emitting Diode (OLED) or the like.

The user input unit 1207 may be operable to receive inputted numeric or character information and to generate key signal inputs related to user settings and function control of the communication device. Specifically, the user input unit 1207 includes a touch panel 12071 and other input devices 12072. The touch panel 12071, also referred to as a touch screen, may collect touch operations on or near the touch panel by the user (such as touch operations of the user using any suitable object or accessory, such as a finger, a stylus, and the like on or near the touch panel 12071). The touch panel 12071 may include two parts, i.e., a touch detector and a touch controller, wherein the touch detector detects a touch orientation of the user, detects a signal caused by the touch operation, and transmits the signal to the touch controller; the touch controller receives touch information from the touch detector, converts the touch information into contact coordinates, sends the contact coordinates to the processor 1210, receives a command from the processor 1210, and executes the command from the processor 1210. In addition, the touch panel 12071 may also be implemented in various types such as a resistive type, a capacitive type, an infrared ray type, and a surface acoustic wave type. The user input unit 1207 may also include other input devices 12072 in addition to the touch panel 12071. Specifically, other input devices 12072 may include, but are not limited to, a physical keyboard, function buttons (such as volume control buttons, switch buttons, etc.), a trackball, a mouse, and an operating lever, which are not described herein.

Further, the touch panel 12071 may be overlaid on the display panel 12061. When the touch panel 12071 detects a touch operation on or near the touch panel 12071, the touch panel 12071 transmits information of the touch operation to the processor 1210 to determine a type of a touch event. The processor 1210 then provides a corresponding visual output on the display panel 12061 according to the type of the touch event. Although in FIG. 12, the touch panel 12071 and the display panel 12061 are two separate components used to implement input and output functions of the communication device, the touch panel 12071 and the display panel 12061 in some embodiments may be integrated to realize the input and output functions of the communication device, and are not limited herein.

The interface unit 1208 is an interface for connecting an external device to the communication device 1200. For example, the external device may include a wired or wireless headset port, an external power source (or a battery charger) port, a wired or wireless data port, a memory card port, a port for connecting a device having an identification module, an audio input/output (I/O) port, a video I/O port, a headphone port, etc. The interface unit 1208 may be used to receive input (e.g., data information, power and the like) from an external device and transmit the received input to one or more elements within the communication device 1200 or may be used to transmit data between the communication device 1200 and an external device.

The storage 1209 may be used to store software programs and various types of data. The storage 1209 may mainly include a storage program region and a storage data region, wherein the storage program region may store an operating system, an application program required by at least one function, such as a sound playing function, an image playing function, and the like; the storage data region may store data (such as audio data, phonebook, etc.) created according to usage of a mobile phone. Further, the storage 1209 may include a high-speed random access memory, and may also include a non-volatile storage, such as at least one disk storage device, a flash memory device, or other volatile solid-state storage devices.

The processor 1210 is a control center of the communication device, connects various parts of the entirety of the communication device using various interfaces and lines, and the processor 1210 performs various functions of the communication device and processes data, by running or executing a software program and/or a module stored in the storage 1209 and invoking data stored in the storage 1209, thereby integrally monitoring the communication device. The processor 1210 may include one or more processing units; optionally, the processor 1210 may be integrated with an application processor and a modem processor, wherein the application processor primarily handles operating systems, user interfaces, application programs, and the like, and the modem processor primarily handles wireless communication. It will be appreciated that the above modem processor may not be integrated into the processor 1210.

The communication device 1200 may also include a power supply 1211, such as a battery, for powering various components, optionally the power supply 1211 may be logically connected to the processor 1210 through a power management system. Thereby, functions of charging management, discharging management, and power consumption management are realized by the power management system.

In addition, the communication device 1200 includes some functional modules that are not shown and will not be described again here.

Optionally, embodiments of the present disclosure also provide a communication device. The communication device includes a processor 1210, a storage 1209, and a computer program stored on the storage 1209 and executable by the processor 1210. When the computer program is executed by the processor 1210, the processor 1210 implements each process of the method embodiments of generating an OFDM symbol, and the same technical effect can be achieved. In order to avoid repetition, the detailed description thereof is omitted here.

In addition, some embodiments of the present disclosure provide a computer-readable storage medium having a computer program stored thereon. When the computer program is executed by a processor, the processor implements various processes of the method embodiments of generating an OFDM symbol, and the same technical effect can be achieved. In order to avoid repetition, the detailed description thereof is omitted here. The computer-readable storage medium includes a Read-Only Memory (ROM), a Random Access Memory (RAM), and a magnetic disk or a compact disc, etc.

It is to be noted that such terms as "including", "including" or any other variant thereof in the present disclosure are intended to cover non-exclusive inclusion such that processes, methods, articles or devices including a series of elements include not only those elements, but also include other elements that are not explicitly listed, or include elements that are inherent to such processes, methods, articles, or devices. An element defined by a statement "including a/an . . . ", if without further limitation, does not exclude presence of another identical element in a process, a method, an article or a device that includes the element.

From the above description of the embodiments, it will be clear to those skilled in the art that the method embodiments described above can be implemented by means of software plus necessary general hardware platforms, of course can also be implemented by means of hardware, however in many cases, the former is a better implementation. Based on such understanding, technical solutions per se, or a part of the technical solutions contributing the prior art, of the present disclosure may be embodied in a form of a software product stored in a storage medium (such as a ROM/RAM, a magnetic disk, an optical disc), which includes a number of instructions used to cause a terminal (which may be a mobile phone, a computer, a server, an air conditioner, or a network device, etc.) to perform the method described in various embodiments of the present disclosure.

The embodiments of the present disclosure have been described above in connection with the accompanying drawings. However, the present disclosure is not limited to specific embodiments described above, which are merely illustrative and not restrictive. Those of ordinary skills in the art may also make numerous forms within the protection scope of the present disclosure without departing from the spirit of the present disclosure and protection scopes of the claims.

What is claimed is:

1. A method of generating an orthogonal frequency division multiplexing (OFDM) symbol, comprising:
  generating a target sequence based on a Phase Tracking Reference Signal (PTRS) bit sequence, and
  generating the OFDM symbol based on the target sequence, wherein the target sequence comprises a symbol sequence generated by inserting a modulated symbol sequence of the PTRS bit sequence into a modulated symbol sequence of et-a data bit sequence and phase-rotating a sequence obtained after the inserting, generating the target sequence based on the PTRS bit sequence comprises:

performing a Binary Phase Shift Keying (BPSK) modulation on the PTRS bit sequence and performing the BPSK modulation on the data bit sequence, inserting a symbol sequence obtained by performing the BPSK modulation on the PTRS bit sequence, into a symbol sequence obtained by performing the BPSK modulation on the data bit sequence, and performing phase-rotation on a symbol sequence obtained after the inserting, so as to generating the target sequence, wherein performing the phase-rotation on the symbol sequence obtained after the inserting comprises: performing the phase-rotation on the symbol sequence obtained after the inserting, according to an index of each symbol in the symbol sequence, wherein a phase by which the each symbol is rotated is $\pi/2$ multiplied by the index of the each symbol in the symbol sequence;

or, wherein the target sequence comprises a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating a data bit sequence according to an index of a data bit, the index of the PTRS bit is an index, in the target sequence, of a modulated symbol corresponding to the PTRS bit, generating the target sequence based on the PTRS bit sequence comprises:

calculating an index, in the target sequence, of each PTRS bit in the PTRS bit sequence, and calculating an index, in the target sequence, of each data bit in the data bit sequence, performing a $\pi/2$ Binary Phase Shift Keying (BPSK) modulation on each PTRS bit according to the index of the each PTRS bit in the target sequence, so as to obtain the PTRS symbol sequence, and performing the $\pi/2$-BPSK modulation on each data bit according to the index of each data bit in the tar et sequence, so as to obtain the data symbol sequence, inserting the PTRS symbol sequence into the data symbol sequence to obtain the target sequence.

2. The method according to claim 1, wherein in a case that a PTRS group size is even, an index, in the target sequence, of each data bit in the data bit sequence is not calculated;

the data symbol sequence is obtained by performing the $\pi/2$-BPSK modulation on the data bit sequence according to the index of the each data bit in the data bit sequence.

3. The method according to claim 1, wherein before generating the target sequence, the method further comprises:

taking X×K bits at a preset position in a Demodulation Reference Signal (DMRS) sequence as the PTRS bit sequence, wherein X is an integer greater than 0, K is an integer greater than 0, and the DMRS sequence is a sequence modulated by using a $\pi/2$-Binary Phase Shift Keying (BPSK) modulation; or taking as the PTRS bit sequence a bit having a location, in a DMRS sequence, corresponding to a PTRS pilot pattern, wherein the DMRS sequence is a sequence modulated by using the $\pi/2$-BPSK modulation; or taking as the PTRS bit sequence a sub-sequence, in a sequence scrambled with a cell identifier, corresponding to a frequency-domain position to which a PTRS resource is mapped, wherein a length of the sequence scrambled with the cell identifier is equal to the number of subcarriers within a system bandwidth.

4. The method according to claim 3, wherein at least two user terminals in a cell corresponding to the cell identifier use the sequence scrambled with the cell identifier to generate the PTRS bit sequence, and sequences scrambled with cell identifiers of different cells are different.

5. A communication device, comprising:

a storage, a processor, and a computer program stored on the storage and executable by the processor, wherein, the computer program is executed by the processor to implement a method of generating an OFDM symbol, the method comprises:

generating a target sequence based on a Phase Tracking Reference Signal (PTRS) bit sequence, and generating the OFDM symbol based on the target sequence, wherein the target sequence comprises a symbol sequence generated by inserting a modulated symbol sequence of the PTRS bit sequence into a modulated symbol sequence of a data bit sequence and phase-rotating a sequence obtained after the inserting, generating the target sequence based on the PTRS bit sequence comprises:

performing a Binary Phase Shift Keying (BPSK) modulation on the PTRS bit sequence and performing the BPSK modulation on the data bit sequence, inserting a symbol sequence obtained by performing the BPSK modulation on the PTRS bit sequence, into a symbol sequence obtained by performing the BPSK modulation on the data bit sequence, and performing phase-rotation on a symbol sequence obtained after the inserting, so as to generating the target sequence, wherein performing the phase-rotation on the symbol sequence obtained after the inserting comprises: performing the phase-rotation on the symbol sequence obtained after the inserting, according to an index of each symbol in the symbol sequence, wherein a phase by which the each symbol is rotated is $\pi/2$ multiplied by the index of the each symbol in the symbol sequence;

or, wherein the target sequence comprises a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating a data bit sequence according to an index of a data bit, the index of the PTRS bit is an index, in the target sequence, of a modulated symbol corresponding to the PTRS bit generating the target sequence based on the PTRS bit sequence comprises:

calculating an index, in the target sequence, of each PTRS bit in the PTRS bit sequence, and calculating an index, in the target sequence, of each data bit in the data bit sequence, performing a π/2-Binary Phase Shift Keying (BPSK) modulation on each PTRS bit according to the index of the each PTRS bit in the target sequence, so as to obtain the PTRS symbol sequence, and performing the π/2-BPSK modulation on each data bit according to the index of each data bit in the target sequence, so as to obtain the data symbol sequence, inserting the PTRS symbol sequence into the data symbol sequence to obtain the target sequence.

6. A non-transitory computer readable storage medium, comprising:

a computer program stored thereon, wherein the computer program is executed by a processor to implement a method of generating an OFDM symbol, the method comprises:

generating a target sequence based on a Phase Tracking Reference Signal (PTRS) bit sequence, and generating the OFDM symbol based on the target sequence, wherein the target sequence comprises a symbol sequence generated by inserting a modulated symbol sequence of the PTRS bit sequence into a modulated symbol sequence of a data bit sequence and phase-rotating a sequence obtained after the inserting, generating the target sequence based ion the PTRS bit sequence comprises:

performing a Binary Phase Shift Keying (BPSK) modulation on the PTRS bit sequence and performing the BPSK modulation on the data bit sequence, inserting a symbol sequence obtained by performing the BPSK modulation on the PTRS bit sequence, into a symbol sequence obtained by performing the BPSK modulation on the data bit sequence, and performing phase-rotation on a symbol sequence obtained after the inserting, so as to generate the sequence, wherein performing the phase-rotation on the symbol sequence obtained after the inserting comprises: performing the phase-rotation on the symbol sequence obtained after the inserting, according to an index of each symbol in the symbol sequence, wherein a phase by which the each symbol is rotated is π/2 multiplied by the index of the each symbol in the symbol sequence;

or wherein the target sequence comprises a symbol sequence generated by inserting a PTRS symbol sequence into a data symbol sequence, wherein, the PTRS symbol sequence is a symbol sequence generated by modulating the PTRS bit sequence according to an index of a PTRS bit, and the data symbol sequence is a symbol sequence generated by modulating a data bit sequence according to an index of a data bit, the index of the PTRS bit is an index, in the target sequence, of a modulated symbol corresponding to the PTRS bit, generating the target sequence based on the PTRS bit sequence comprises:

calculating an index, in the target sequence, of each PTRS bit in the PTRS bit sequence, and calculating an index in the target sequence, of each data bit in the data bit sequence, performing a π/2-Binary Phase Shift Keying (BPSK) modulation on each PTRS bit according to the index of the each PTRS bit in the target sequence, so as to obtain the PTRS symbol sequence, and performing the π/2-BPSK modulation on each data bit according to the index of each data bit in the target sequence, so as to obtain the data symbol sequence, inserting the PTRS symbol sequence into the data symbol sequence to obtain the target sequence.

7. The method according to claim 1, wherein the index, in the target sequence, of the modulated symbol corresponding to the PTRS bit is obtained from a PTRS pilot pattern.

8. The communication device according to claim 5, wherein in a case that a PTRS group size is even, an index, in the target sequence, of each data bit in the data bit sequence is not calculated;

the data symbol sequence is obtained by performing the π/2-BPSK modulation on the data bit sequence according to the index of the each data bit in the data bit sequence.

9. The communication device according to claim 5, wherein before generating the target sequence, the method further comprises:

taking X×K bits at a preset position in a Demodulation Reference Signal (DMRS) sequence as the PTRS bit sequence, wherein X is an integer greater than 0, K is an integer greater than 0, and the DMRS sequence is a sequence modulated by using a π/2-Binary Phase Shift Keying (BPSK) modulation; or taking as the PTRS bit sequence a bit having a location, in a DMRS sequence, corresponding to a PTRS pilot pattern, wherein the DMRS sequence is a sequence modulated by using the π/2-BPSK modulation; or taking as the PTRS bit sequence a sub-sequence, in a sequence scrambled with a cell identifier, corresponding to a frequency-domain position to which a PTRS resource is mapped, wherein a length of the sequence scrambled with the cell identifier is equal to the number of subcarriers within a system bandwidth.

10. The communication device according to claim 9, wherein at least two user terminals in a cell corresponding to the cell identifier use the sequence scrambled with the cell identifier to generate the PTRS bit sequence, and sequences scrambled with cell identifiers of different cells are different.

11. The communication device according to claim 5, wherein the index, in the target sequence, of the modulated symbol corresponding to the PTRS bit is obtained from a PTRS pilot pattern.

12. The non-transitory computer readable storage medium according to claim 6, wherein before generating the target sequence, the method further comprises:

taking X×K bits at a preset position in a Demodulation Reference Signal (DMRS) sequence as the PTRS bit sequence, wherein X is an integer greater than 0, K is an integer greater than 0, and the DMRS sequence is a sequence modulated by using a π/2-Binary Phase Shift Keying (BPSK) modulation; or taking as the PTRS bit sequence a bit having a location, in a DMRS sequence, corresponding to a PTRS pilot pattern, wherein the DMRS sequence is a sequence modulated by using the π/2-BPSK modulation; or taking as the PTRS bit sequence a sub-sequence, in a sequence scrambled with a cell identifier, corresponding to a frequency-domain position to which a PTRS resource is mapped, wherein a length of the sequence scrambled with the cell identifier is equal to the number of subcarriers within a system bandwidth.

* * * * *